United States Patent Office 2,970,155
Patented Jan. 31, 1961

2,970,155

16α-METHYL-17α-HYDROXY - Δ⁹ - PREGNENE-3,20-DIONE AND PROCESS FOR MANUFACTURE

Robert Joly, Montmorency, Julien Warnant, Neuilly-sur-Seine, and Leon Velluz, Paris, France, assignors to Les Laboratoires Francais de Chimiotherapie, Paris, France, a corporation of France No Drawing. Filed May 12, 1960, Ser. No. 28,543

Claims priority, application France May 15, 1959

5 Claims. (Cl. 260—397.45)

The present invention relates to a novel methylated pregnane ketone and the process for its production.

More particularly, it relates to the production of the novel compound 16α-methyl-17α-hydroxy-Δ⁹-pregnene-3,20-dione of the formula:

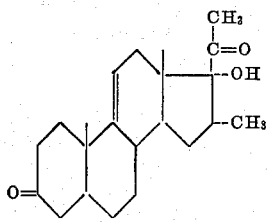

which is a physiologically-active product and can, moreover, be used as the intermediate in the preparation of other physiologically-active derivatives of the 16α-methyl-pregnane series. For example, the said 16α-methyl-17α-hydroxy-Δ⁹-pregnene-3,20-dione can be brominated in the 2,4-position, dehydrobrominated according to the known processes, acetoxylated in the 21-position according to the process described in the copending commonly-assigned patent application Serial No. 3,514, filed January 20, 1960, now abandoned, and 16α-methyl-9α-fluoro-prednisolone acetate or Dexamethasone can finally be obtained, according to known processes.

The series of operations described above are shown in the following schematic reaction equation below.

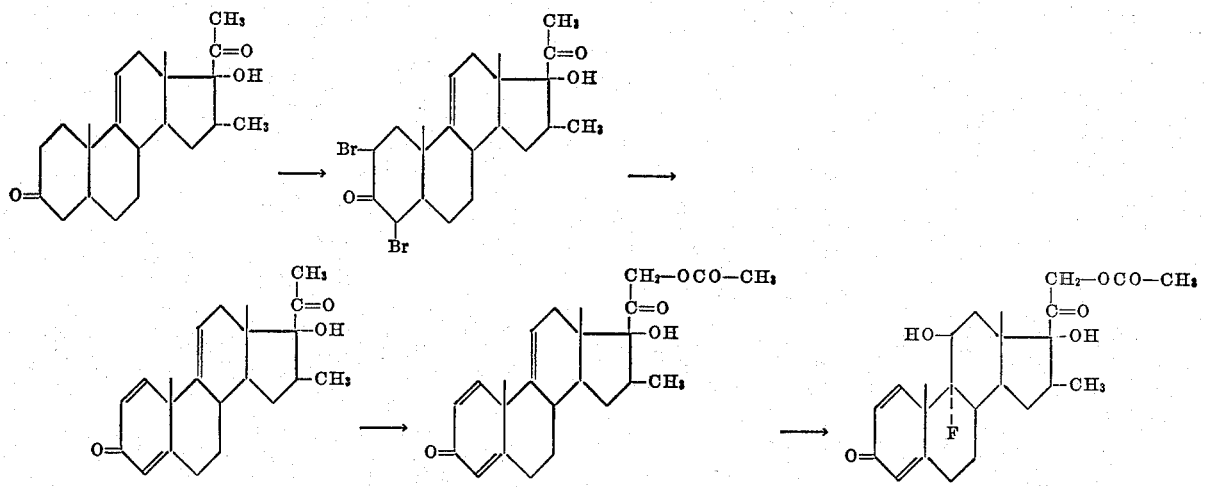

An object of this invention is the obtention of 16α-methyl-17α-hydroxy-Δ⁹-pregnene-3,20-dione.

A further object is to provide a process for producing 16α-methyl-17α-hydroxy-Δ⁹-pregnene-3,20-dione.

These and other objects of our invention will become apparent as the description thereof proceeds.

The 16α-methyl-17α-hydroxy-Δ⁹-pregnene-3,20-dione of the invention is prepared by oxidation of 16α-methyl-3α,17α-dihydroxy-Δ⁹-pregnene-20-one illustrated as follows:

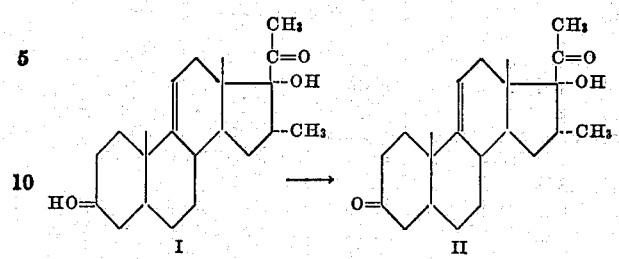

The starting material (I) is obtained by the method disclosed in the copending, commonly-assigned patent application Serial No. 862,491, filed December 29, 1959, starting with 16α-methyl-3α,17α-dihydroxy-pregnane-11,20-dione by formation of the 20 semicarbazone, reduction of the latter with potassium borohydride, regeneration of the ketone function in the 20-position by pyruvic acid exchange and dehydration in the 9,11-position through the 11-mesylate intermediate (11-methane sulfonate ester).

According to the preferred mode of operation of the process of the present invention, chromic acid is dissolved at a low temperature in pyridine, a pyridine solution of 16α-methyl-3α,17α-dihydroxy-Δ⁹-pregnene-20-one (I) is added thereto, the mixture is agitated, 16α-methyl-17α-hydroxy-Δ⁹-pregnene-3,20-dione (II) formed thereby is precipitated out, and the latter is isolated by extraction in an appropriate solvent, such as chloroform.

The following example is provided to illustrate our invention and enables persons skilled in the art to practice the invention without, however, limiting it. The melting points recited in the example have been determined on a Maquenne block.

EXAMPLE

*Preparation of 16α-methyl-17α-hydroxy-Δ⁹-pregnene-3,20-dione*

At a temperature below 10° C., 2 gm. of chromic acid are dissolved in 20 cc. of pyridine, the temperature is allowed to rise to 15° C. and then a solution of 2 gm. of 16α-methyl-3α,17α-dihydroxy-Δ⁹-pregnene-20-one in 20 cc. of pyridine is added thereto. The solution is agitated at room temperature for 46 hours, the isoluble portion is separated by vacuum filtration, it is extracted with chloroform and a mixture of 100 gm. of crushed ice and 100 cc. of water are added to the pyridine solution. The mixture is agitated and vacuum filtered. The filter cake is dissolved in chloroform, all the chloroform solutions are combined, washed with water, then with 1 N sulfuric acid and again with water, dried on sodium sulfate and evaporated to dryness in nitrogen.

1.560 gm., that is, a yield of 78.4% of 16α-methyl-17α-hydroxy-$\Delta^9$-pregnene-3,20-dione, melting point=198° C., specific rotation $[\alpha]_D^{20}=+22.5°\pm1$ (c.=0.5% acetone), are obtained.

The product, which has not been previously known, is obtianed in the form of small colorless crystals, insoluble in water and ether, slightly soluble in alcohol and acetone, and soluble in benzene and chloroform.

Analysis.—$C_{22}H_{32}O_3$=344.48.—Calculated: C, 76.7%; H, 9.36%. Found. C, 76.9%; H, 9.3%.

While we have set forth a specific example and preferred mode of practice of our invention, it will be understood that the invention is not limited thereto and that various changes and modifications may be made in the invention without departing from the spirit of the disclosure and the scope of the appended claims.

We claim:
1. 16α-methyl-17α-hydroxy-$\Delta^9$-pregnene-3,20-dione.
2. A process for producing 16α-methyl-17α-hydroxy-$\Delta^9$-pregnene-3,20-dione which comprises oxidizing 16α-methyl-3α,17α-dihydroxy-$\Delta^9$-pregnene-20-one.
3. A process for producing 16α-methyl-17α-hydroxy-$\Delta^9$-pregnene-3,20-dione which comprises oxidizing 16α-methyl-3α,17α-dihydroxy-$\Delta^9$-pregnene-20-one with chromic acid.
4. A process for producing 16α-methyl-17α-hydroxy-$\Delta^9$-pregnene-3,20-dione which comprises dissolving chromic acid in pyridine, reacting a pyridine solution of 16α-methyl-3α,17α-dihydroxy-$\Delta^9$-pregnene-20-one with said chromic acid solution, precipitating 16α-methyl-17α-hydroxy-$\Delta^9$-pregnene-3,20-dione, and extracting said precipitate with an organic solvent.
5. A process for producing 16α-methyl-17α-hydroxy-$\Delta^9$-pregnene-3,20-dione which comprises dissolving chromic acid in pyridine at low temperature, adding a pyridine solution of 16α-methyl-3α,17α-dihydroxy-$\Delta^9$-pregnene-20-one to said chromic acid solution and agitating at room temperature, precipitating 16α-methyl-17α-hydroxy-$\Delta^9$-pregnene-3,20-dione, and extracting said precipitate with chloroform.

No references cited.

UNITED STATES PATENT OFFICE
CERTIFICATION OF CORRECTION

Patent No. 2,970,155          January 31, 1961

Robert Joly et al.

It is hereby certified that error appears in the above numbered patent requiring correction and that the said Letters Patent should read as corrected below.

Column 2, lines 3 to 13, Formula I should appear as shown below instead of as in the patent:

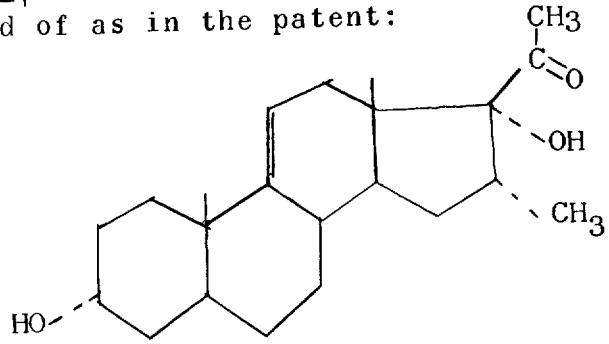

column 2, line 68, for "isoluble" read -- insoluble --; column 3, line 10, for "obtianed" read -- obtained --.

Signed and sealed this 1st day of August 1961.

(SEAL)
Attest:

ERNEST W. SWIDER
Attesting Officer

DAVID L. LADD
Commissioner of Patents